(12) United States Patent
Lee et al.

(10) Patent No.: US 9,087,540 B1
(45) Date of Patent: Jul. 21, 2015

(54) ASYMMETRICAL WRITE FAULT THRESHOLDS

(71) Applicant: Seagate Technology LLC, Cupertino, CA (US)

(72) Inventors: Jungho Lee, Hwasung (KR); Jae Myung Chung, Suwon (KR); Jung Min Yoon, Gyeonggi-do (KR); Hwa Jun Kim, Hwaseong-si (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/335,689

(22) Filed: Jul. 18, 2014

(51) Int. Cl.
*G11B 5/58* (2006.01)
*G11B 5/596* (2006.01)

(52) U.S. Cl.
CPC .................................. *G11B 5/59627* (2013.01)

(58) Field of Classification Search
CPC .... G11B 5/584; G11B 5/488; G11B 5/59688; G11B 21/083; G11B 5/59633; G11B 5/58; G11B 5/5547
USPC ......... 360/77.01, 75, 60, 77.07, 77.17, 78.14, 360/77.02, 77.08, 77.06
See application file for complete search history.

(56) References Cited

U.S. PATENT DOCUMENTS

| | | | |
|---|---|---|---|
| 6,310,741 B1 | 10/2001 | Nishida et al. | |
| 6,384,997 B1 | 5/2002 | Wu et al. | |
| 6,421,197 B1 * | 7/2002 | Abdelnour | ................. 360/77.02 |
| 6,442,705 B1 | 8/2002 | Lamberts | |
| 6,657,805 B2 * | 12/2003 | Nishida et al. | .................. 360/60 |
| 6,687,064 B1 | 2/2004 | Jiang et al. | |
| 6,704,837 B2 | 3/2004 | Beardsley et al. | |
| 6,717,757 B1 | 4/2004 | Levy | |
| 6,795,262 B1 | 9/2004 | Codilian | |
| 6,882,489 B1 | 4/2005 | Brunnett et al. | |
| 6,940,679 B1 | 9/2005 | McNeil | |
| 6,975,468 B1 | 12/2005 | Melrose et al. | |
| 7,154,690 B1 * | 12/2006 | Brunnett et al. | ................. 360/60 |
| 7,215,497 B2 | 5/2007 | Urata | |
| 7,253,982 B1 | 8/2007 | Brunnett et al. | |
| 7,304,816 B2 | 12/2007 | Johnson et al. | |
| 7,423,828 B2 | 9/2008 | Emo et al. | |
| 7,545,593 B1 | 6/2009 | Sun | |
| 8,000,053 B1 | 8/2011 | Anderson | |
| 8,587,889 B2 | 11/2013 | Kawabe | |
| 8,619,381 B2 | 12/2013 | Moser | |
| 8,736,995 B1 | 5/2014 | Wiesen et al. | |
| 2007/0074073 A1 | 3/2007 | Chen et al. | |
| 2007/0230691 A1 | 10/2007 | Elhamias | |
| 2007/0236818 A1 | 10/2007 | Emo | |
| 2008/0055765 A1 | 3/2008 | Abe | |
| 2008/0180826 A1 | 7/2008 | Cho | |
| 2009/0180207 A1 | 7/2009 | Cho | |
| 2012/0038997 A1 | 2/2012 | Jia | |
| 2014/0118857 A1 | 5/2014 | Kashiwagi et al. | |

* cited by examiner

*Primary Examiner* — Nabil Hindi
(74) *Attorney, Agent, or Firm* — Cesari & Reed LLP; Kirk A. Cesari

(57) ABSTRACT

Systems and methods are disclosed that implement asymmetrical write fault thresholds. A data storage device may apply a different write fault threshold to each side of a target track, allowing a write head to deviate from a track center more in one direction than in the other direction. In some embodiments, the asymmetrical write fault thresholds may be applied to shingled tracks, allowing a lower write fault threshold to be applied in the direction of previously written shingled tracks, and a higher write fault threshold to be applied in the direction of tracks which are not yet written.

20 Claims, 10 Drawing Sheets

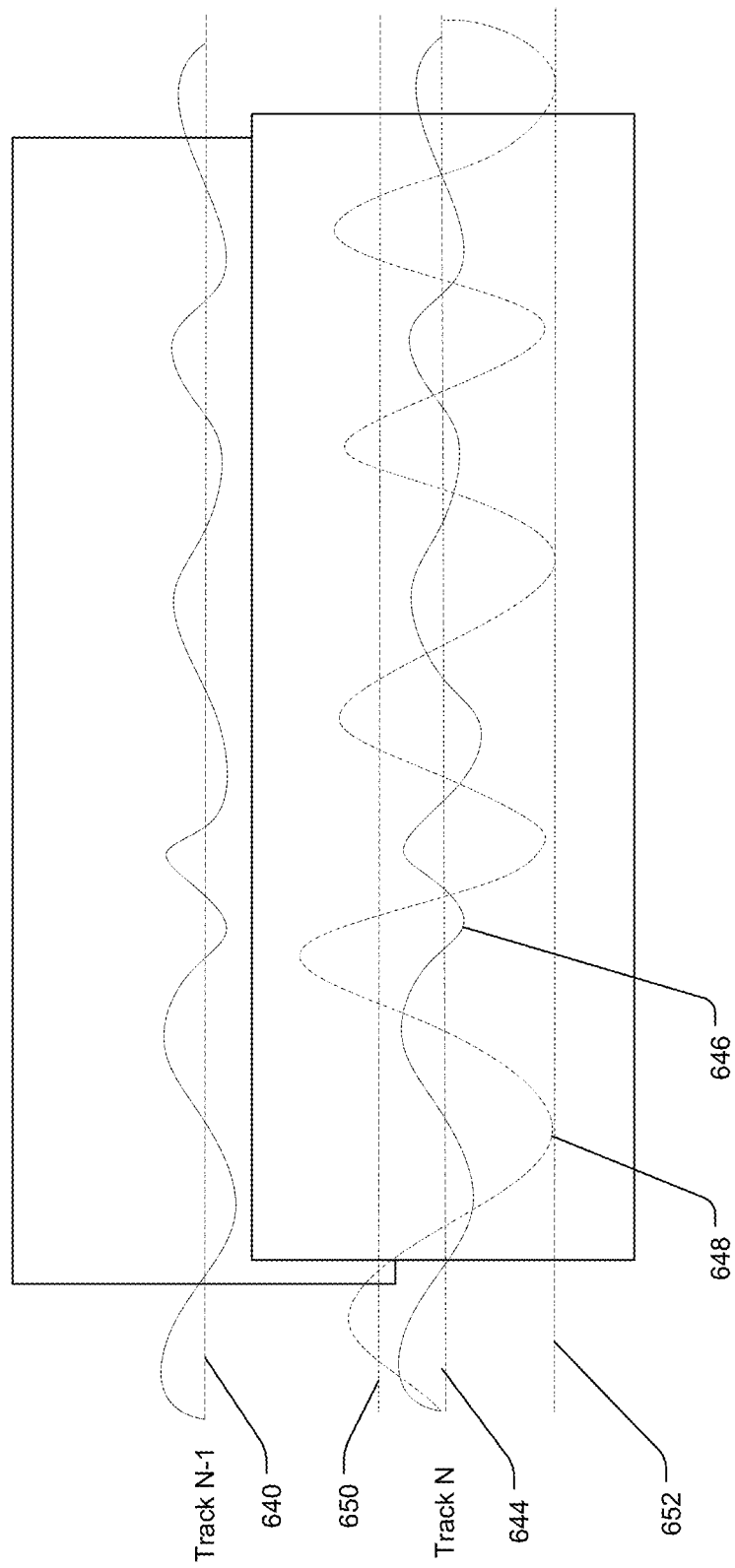

ASYMMETRICAL WRITE FAULT THRESHOLDS

SUMMARY

In certain embodiments, an apparatus may comprise a circuit configured to determine a first write fault value and a second write fault value for a set of tracks of a data storage device, the first write fault value and the second write fault value each representing an amount of off-track deviation of a data writing system within which data writing operations are performed, the first write fault value having a lower fault tolerance for the data writing system to deviate from a track center than the second write fault value; and write data to a selected track in the set of tracks. Writing the data may include applying the first write fault value relative to the selected track in a direction of a first adjacent track immediately preceding the selected track, and applying the second write fault value relative to the selected track in a direction of a second adjacent track immediately following the selected track.

In certain embodiments, a method may comprise determining a first write fault value and a second write fault value for a target track of a disc memory, the first write fault value and the second write fault value each representing an amount of off-track deviation of a data writing system within which data writing operations are performed, the first write fault value having a lower fault tolerance from a track center of the target track than the second write fault value; and writing data to the target track, including applying the first write fault value in a direction of a first track immediately preceding the target track, and applying the second write fault value in a direction of a second track immediately following the target track.

In certain embodiments, a memory device may store instructions that, when executed, cause a processor to perform a method comprising receiving a write command including data to be written to a target track, and writing the data to the target track, including applying a first write fault value in a first direction from the target track, and applying a second write fault value in a second direction from the target track. The first write fault value and the second write fault value may each represent an amount of off-track deviation of a recording head from a track center within which data writing operations are performed, the first write fault value having a lower fault tolerance from the track center than the second write fault value.

BRIEF DESCRIPTION OF THE DRAWINGS

FIGS. 6A, 6B, and 6C are diagrams of examples of a system including write faults, in accordance with certain embodiments of the present disclosure;

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that, when executed, cause a processor to perform the methods.

Figure 1:
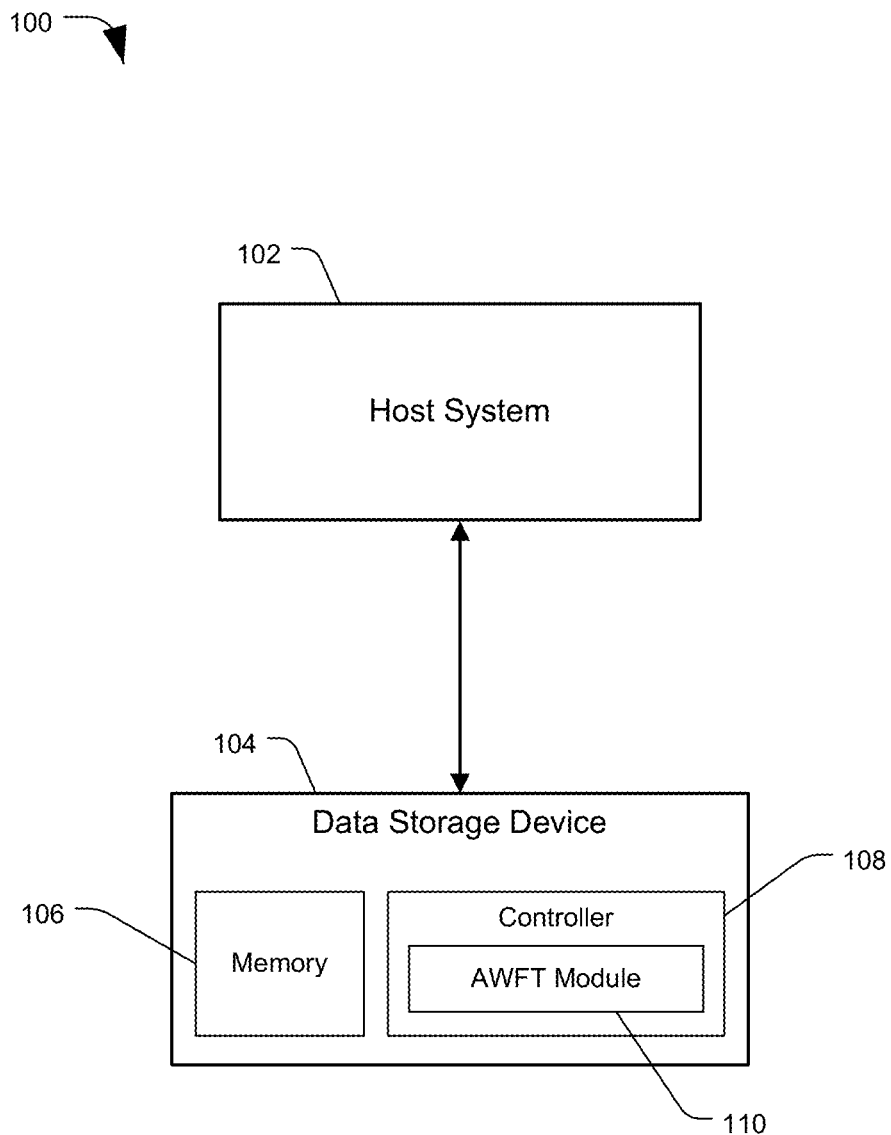
FIG. 1 is a diagram of a system having asymmetrical write faults, in accordance with certain embodiments of the present disclosure.

FIG. 1 is a diagram of a system having asymmetrical write faults, generally designated 100, in accordance with certain embodiments of the present disclosure. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The memory 106 may comprise magnetic storage media such as disc drives, nonvolatile solid state memories such as Flash memory, other types of memory, or a combination thereof. The controller 108 may comprise a circuit or processor configured to control operations of the data storage device 104, such as storing data to or retrieving data from the memory 106. The DSD 104 may receive a data read or write request from the host device 102, and use the controller 108 to perform data operations on the memory 106 based on the request.

DSD 104 may include an asymmetrical write fault threshold (AWFT) module 110. The AWFT module 110 may be a processor, controller, or other circuit, or it may be a set of software instructions that, when executed by a processing device, perform the functions of the AWFT module 110. In some embodiments, the AWFT may be part of or executed by controller 108. The AWFT module 110 may control write operations or parameters of write operations to a memory, such as memory 106. For example, the AWFT module 110 may control when to suspend write operations based on how far a write head has deviated from a set write path. A distance a head may move from the write path before write operations are suspended may be called a write fault threshold, and when the head moves beyond this distance, it may be called a write fault. In some embodiments, the AWFT module 110 may suspend write operations if a write head deviates by a first amount or distance in a first direction or to a first side of the write path, and suspend write operations if the write head deviates by a second amount in a second direction or to a second side of the write path. For example, if a recording head is following a recording track of a disc memory, the AWFT module 110 may suspend write operations if the write head moves a first distance from the recording track towards the outer diameter (OD) of the disc, and suspend write operations if the write head moves a second distance from the track towards the inner diameter (ID) of the disc.

Figure 2:
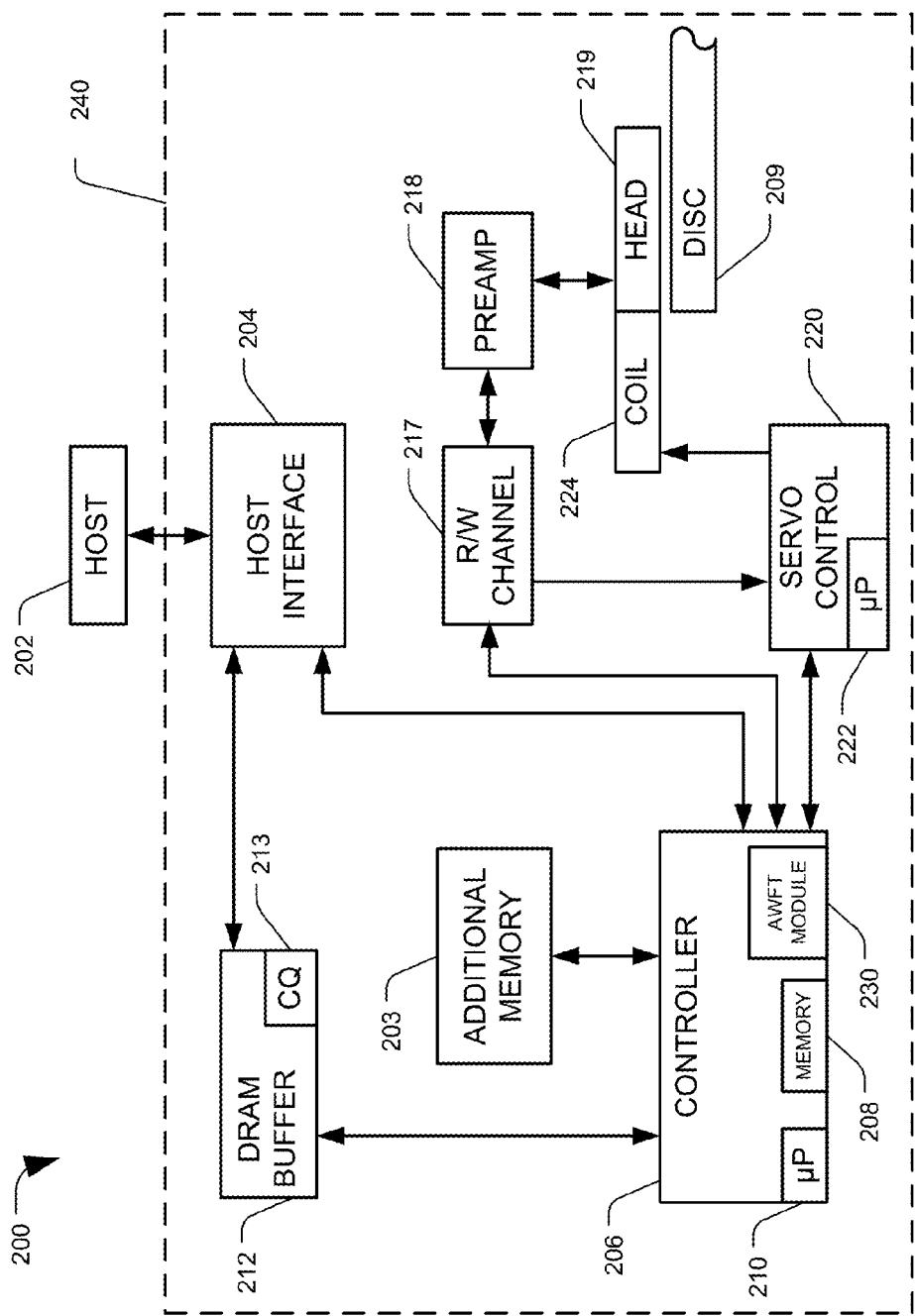
FIG. 2 is a diagram of a system having asymmetrical write faults, in accordance with certain embodiments of the present disclosure.

FIG. 2 is a diagram of a system having asymmetrical write faults, generally designated 200, in accordance with certain embodiments of the present disclosure. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD 200, or the components of the DSD 200 may be attached to the housing, or a combination thereof. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of read-back signals. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213. In some embodiments, the DSD 200 may include solid state memory instead of or in addition to disc memory. For example, the DSD 200 can include an additional memory 203, which can be either volatile memory such as DRAM or SRAM, or non-volatile memory, such as NAND Flash memory. The additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

DSD 200 may include an asymmetrical write fault threshold (AWFT) module 230. The AWFT module 230 may be a processor, controller, or other circuit, or it may be a set of software instructions that, when executed by a processing device, perform the functions of the AWFT module 230. In some embodiments, the AWFT may be part of or executed by controller 206. The AWFT module 230 may control write operations or parameters of write operations to a memory, such as discs 209. For example, the AWFT module 230 may control when to suspend write operations based on how far a write head 219 has deviated from a set write path. In some embodiments, the AWFT module 230 may suspend write operations if write head 219 deviates by a first amount or distance in a first direction or to a first side of the write path, and suspend write operations if the write head deviates by a second amount in a second direction or to a second side of the write path. For example, if a recording head is following a recording track of a disc memory 209, the AWFT module 230 may suspend write operations if the write head 219 moves a first distance from the recording track towards the outer diameter (OD) of the disc 209, and suspend write operations if the write head 219 moves a second distance from the track towards the inner diameter (ID) of the disc 209.

The data storage capability of a given media recording surface, such as for disc(s) 209, can depend in part on the track density (e.g., the number of tracks per unit of radial width such as tracks per inch, TPI). Factors influencing TPI can include the recording sub-system (RSS) (e.g., head, disk, preamp, read channel) as well as servo-mechanical elements. Increasing TPI, for example by bringing the centerlines of adjacent tracks closer together, can also increase areal data density of a storage medium.

Increasing TPI, however, may make the servo reliability or error rate of the recording system more susceptible to track misregistration (TMR) which can involve misalignments of the transducer with a given track. TMR errors can arise from a number of factors, including operational aspects of the recording subsystem or the servo-mechanical control system. TMR can also arise from external effects, such as through the application of externally generated vibration to a device.

Figure 3A:
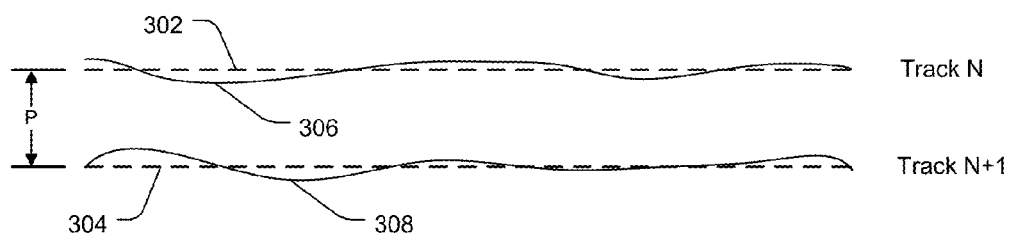
FIGS. 3A and 3B are diagrams of examples a system including write faults, in accordance with certain embodiments of the present disclosure.

FIG. 3A depicts a diagram a system including write faults, in accordance with certain embodiments of the present disclosure. FIG. 3A shows two example tracks defined on a recording surface of a recording medium, such as disc(s) 209 of FIG. 2. The tracks are identified as track N and track N+1. Each of the tracks may be defined by nominal centerlines 302, 304, depicted as dashed lines. The nominal centerlines 302, 304 may be separated by a nominal track pitch P. Each of the centerlines 302, 304 may be at a fixed radius of the medium and may represent an ideal circular path around the center of the medium. The tracks may vary radially about these centerlines 302, 304 due to a number of repeatable runout (RRO) and non-repeatable runout (NRRO) components. RRO components contribute to head to track misregistration that is the same over each revolution of the medium. NRRO components may vary over each revolution of the medium.

For example, the RRO components may include errors due to the placement of the servo data used by the servo circuit, such as servo control 220 of FIG. 2, to define the tracks. The servo data may define somewhat "wavy" centerlines 306, 308 that deviate from the ideal centerlines 302, 304, and these variations will be experienced over each revolution. In other words, rather than defining perfectly circular track centerlines around the center of the medium, like ideal centerlines 302, 304, the servo data may define centerlines 306, 308 that have small irregularities or aberrations and are therefore not perfectly circular. NRRO components may arise due to a number of factors associated with the recording subsystem (e.g., read head, etc.), the servo-mechanical system (servo, VCM, etc.), or external sources (externally generated vibration, etc.). RRO components, NRRO components, or both, can influence the ability of the servo control circuit to cause the write transducer to be positioned to write data precisely along the centerlines of the tracks defined by the servo data.

When TMR becomes too severe, data written to track N+1 may overwrite data written to track N, to the point where data on track N cannot be recovered. Failure to recover data from a track may be referred to as a hard error. This can be especially prevalent when storage mediums have a high TPI. In order to reduce the likelihood of data loss due to off-track writing, recording systems may use write fault gates during data storage operations. Write fault gates may prevent a transducer from writing data if the transducer has deviated too far from the center of the target track. The distance within which a transducer may write data may be referred to as a write fault threshold (WFT), or write bump control limit (WBCL). In some embodiments, write fault thresholds, write fault gates, or both, may be managed by the servo control system 220, processor 222, AWFT module 230, or a combination thereof.

When a write fault threshold is exceeded, such as may happen if a data storage device is bumped or experiencing vibration conditions, data writing may be suspended to prevent data loss on tracks near the track being written. When data operations are suspended, the write performance of a device as a factor of data recording throughput may be reduced. Accordingly, a write fault threshold may be selected that is low or "tight" enough to protect data integrity, but high or "loose" enough to maintain an acceptable level of recording performance.

Figure 3B:
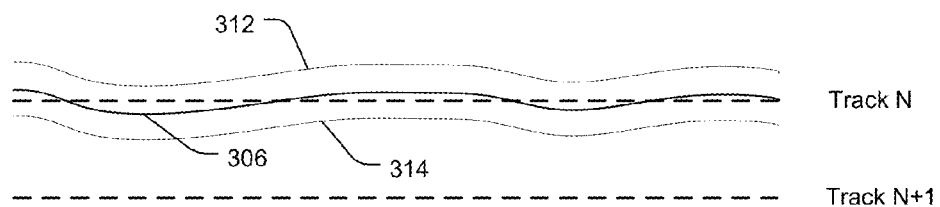

Turning to FIG. 3B, a diagram of a system including write faults is shown, in accordance with certain embodiments of the present disclosure. Lines 312 and 314 may represent write fault threshold (WFT) values on each side of the servo centerline 306. The lines 312, 314 may represent some percentage of acceptable off-track deviation of the position of the write transducer (e.g. head 219 of FIG. 2) during the writing of data to the target track N. This value can vary, for example depending on whether a system employs shingled recording or non-shingled recording. In some embodiments, the WFT may be on the order of about +/−15% of a total track width value for non-shingled recording. In some embodiments, such as for data writing operations utilizing shingled magnetic recording (SMR), where a track partially overlaps an adjacent track, lower write fault threshold values may be applied than the thresholds applied in non-shingled recording. Any values suitable to meet performance goals can be selected for the WFT values.

If the transducer moves outside of the WFT area, a write fault may be declared and the transducer will not write data. It should be noted that FIGS. 3A and 3B illustrate a single-sided squeeze condition between tracks N and N+1. In many cases, there may also be a double-sided squeeze condition including the simultaneous encroachment of tracks N−1 and N+1 on the track N. These embodiments apply equally well to both cases.

Figure 4A:
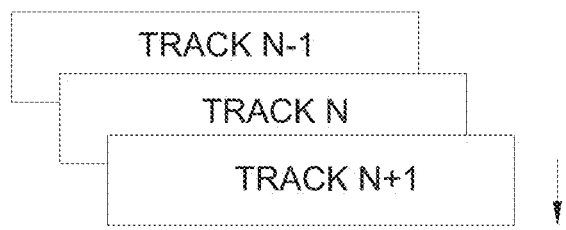
FIGS. 4A and 4B are diagrams of examples a system having asymmetrical write faults, in accordance with certain embodiments of the present disclosure.
Figure 4B:
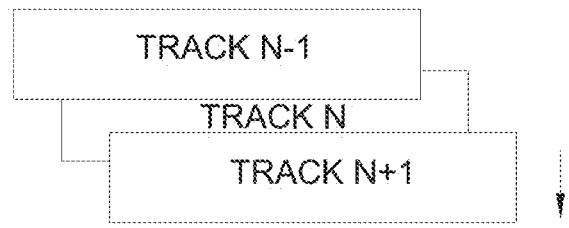

FIGS. 4A and 4B are diagrams of examples a system having asymmetrical write faults, in accordance with certain embodiments of the present disclosure. FIGS. 4A and 4B depict data recording tracks arranged in a shingled manner according to certain embodiments of the present disclosure. In some embodiments, such as with shingled magnetic recording (SMR), each track may partially overlap an adjacent track, and data may only be written in a specified direction (e.g. first track N−1, then track N, then track N+1, etc.). The shingle write direction may be referred to as the "positive" direction, while the opposite writing direction may be referred to as the "negative" direction. It should be understood that the positive direction may be from the inner diameter (ID) to the outer diameter (OD) of the recording medium, or vice versa. The positive direction may even be different per zone or per shingled recording band, for example based on a write head's writing capabilities in different directions at different points over a recording medium.

Referring to FIG. 4A, if it is assumed that writing is performed in the arrow-indicated positive direction in the shingle-write scheme, when writing to track N, adjacent track N−1 may be partially overwritten. Similarly, when writing is performed on track N+1, adjacent track N may be partially overwritten. In contrast to recording methods where each track is written without any intentional overlap, SMR may result in increased recording density due to a higher tracks per inch (TPI) characteristic in a radial direction of a storage medium.

As illustrated in FIG. 4B, after writing on track N, if track N−1 is written in the negative direction of the positive shingled recording direction, track N may become unreadable due to Adjacent Track Interference (ATI), or being partially overwritten by both adjacent tracks (i.e. track N−1 and track N+1). Therefore, it may be advantageous to follow a constraint that track N−1 should not be written after track N is written. Accordingly, writing or modifying data on track N−1 after track N is recorded, or on track N after track N+1 is recorded, may require a different writing strategy than with non-shingled tracks, which can simply be overwritten at any time. In some embodiments, data may be written to each track in a set of shingled tracks in a sequential order having a first writing direction.

Figure 5:
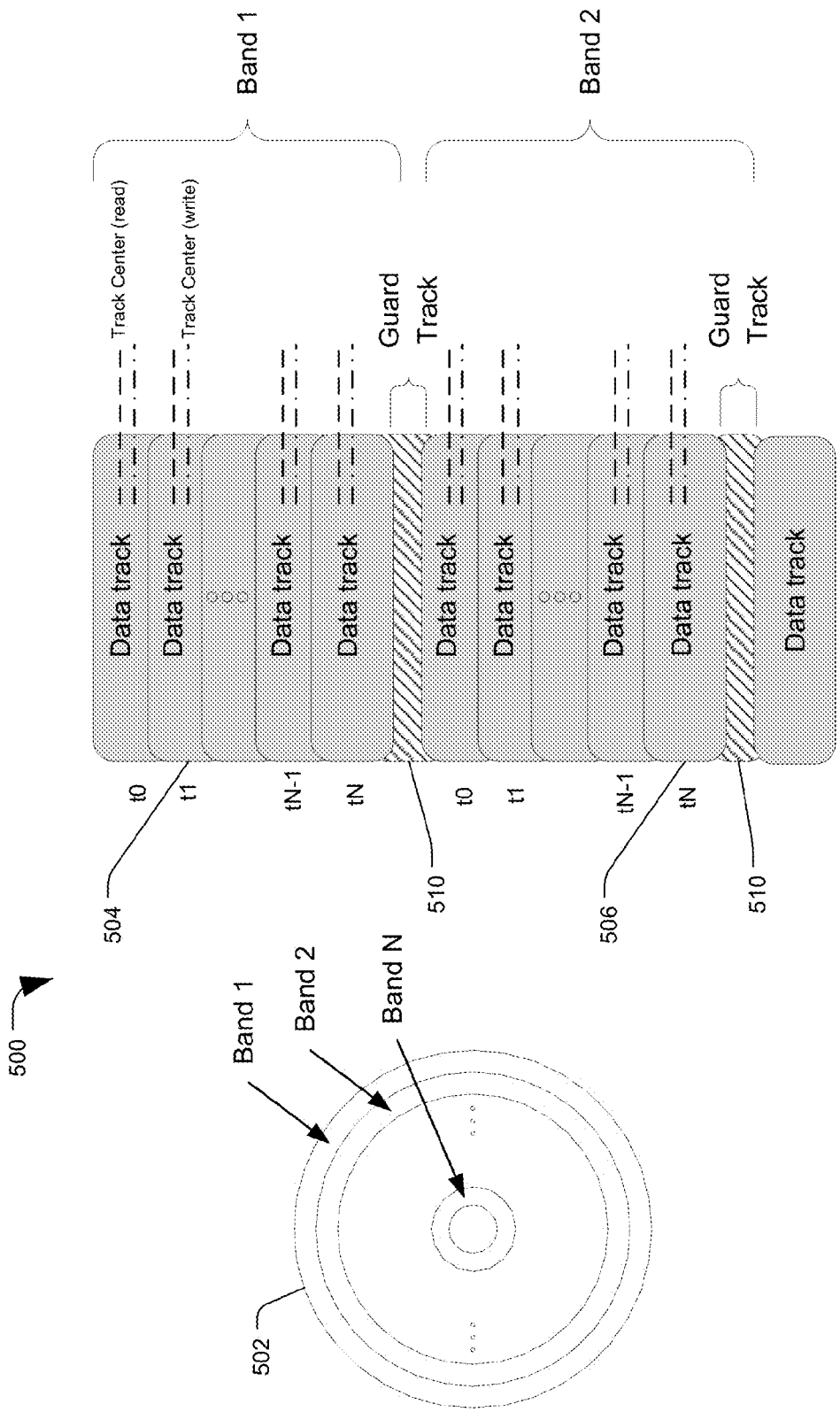
FIG. 5 is a diagram of a system having asymmetrical write faults, in accordance with certain embodiments of the present disclosure.

Turning now to FIG. 5, a diagram of a system having asymmetrical write faults is depicted, in accordance with certain embodiments of the present disclosure. Due to the track write overlap of SMR, writing a given track N−1 after track N has been written may require rewriting all shingled tracks that following track N−1 (i.e. track N, track N+1, track N+2, etc.). In order to accomplish this realistically, a set of shingled tracks may be grouped into a "band," such that writing the last track of a given band X does not require rewriting any of the following tracks in bands X+1, X+2, X+3 and so on. Rotating disc media 502 may be divided into a plurality of bands (e.g. Band 1, Band 2, etc.), and each band may contain a plurality of shingled data tracks, in which at least one data track partially overlaps another data track in a shingled manner.

Separating bands so that rewriting one does not require rewriting tracks outside the band can be accomplished by locating the tracks such that the last track of a band is not trimmed or overlapped by a track that can be written. The last track of a band may be referred to as a "fat track," since it is not overlapped by another track to reduce its pitch or width. Fat tracks can be achieved in a number of ways. For example, track spacing may be formatted so that the last track of each band does not have an overlapping track adjacent. However, this may require two or more different track pitches for bands, with a first for shingled tracks and a second pitch for end-of-band tracks that are not to be partially overwritten.

Alternatively, one or more tracks following each end-of-band track can be designated as "not to be written." Bands may have a number of shingled tracks 504, such as tracks t0 through tN−1 of FIG. 5, which are partially overlapped by adjacent tracks and have a reduced read track pitch relative to the write track pitch. Bands may also end with an unshingled "fat" track 506, such as track tN of FIG. 5, which does not have a reduced read track pitch relative to its write track pitch. Because the last track 506 is not overlapped by a writable track, the band can be rewritten without affecting tracks outside the band. The last track 506 of each band may be followed by a "not-to-be-written" track, preventing the last track from being partially overwritten. Not-to-be-written tracks may be referred to as "guard tracks" 510, as they provide band boundaries to separate writable tracks of different bands and guard the last track 506 of a band from being trimmed by or trimming tracks outside the band. When track t0 needs to be re-written, tracks t0 to the fat track tN 506 can be rewritten, while tracks in other bands are not affected. In some embodiments, a single guard track may be used, while in some embodiments multiple tracks may be designated as "not to be written" between bands to provide a larger buffer against ATI. A guard track may also be referred to as a guard band or isolation track.

In some embodiments, the guard track between bands can be a full non-shingled track (i.e. a track not trimmed by either adjacent track), but this may again require different track pitches and consequently require determining band boundaries prior to defining the tracks on the disc. In other embodiments, a guard track may be a shingled track which is not used to store data. In other words, all writable tracks and guard tracks may have the same width. In an example embodiment of a disc with multiple bands per zone, each zone may contain 110 tracks, and the 110 tracks may be divided into 10 bands containing 10 data tracks and 1 guard track each.

Guard tracks may be overlapped by both adjacent tracks without loss of data, as data may not be recorded to guard tracks. Accordingly, while all tracks may share the same width or write track center when defined on the disc, a band may include multiple track "widths" or read track centers in practice. As shown in FIG. 5, trimmed tracks 504 may have one width due to being partially overlapped in one direction; the last data tracks 506 in each band, or "fat tracks," may have a second track width due to not being overlapped in either direction; and the guard tracks 510 may have a third track width due to being overlapped in both directions.

Figure 6A:
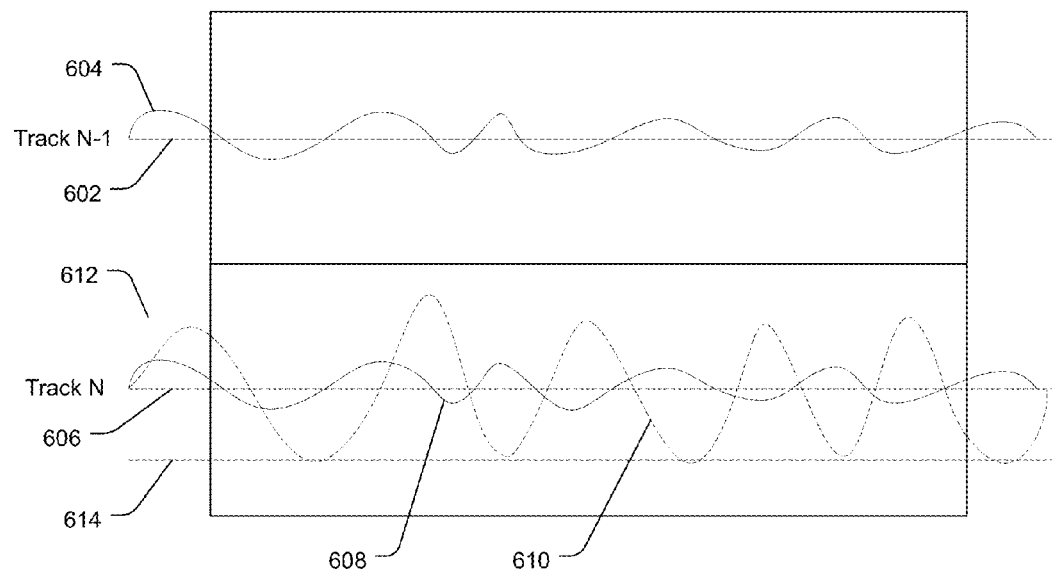
Figure 6B:
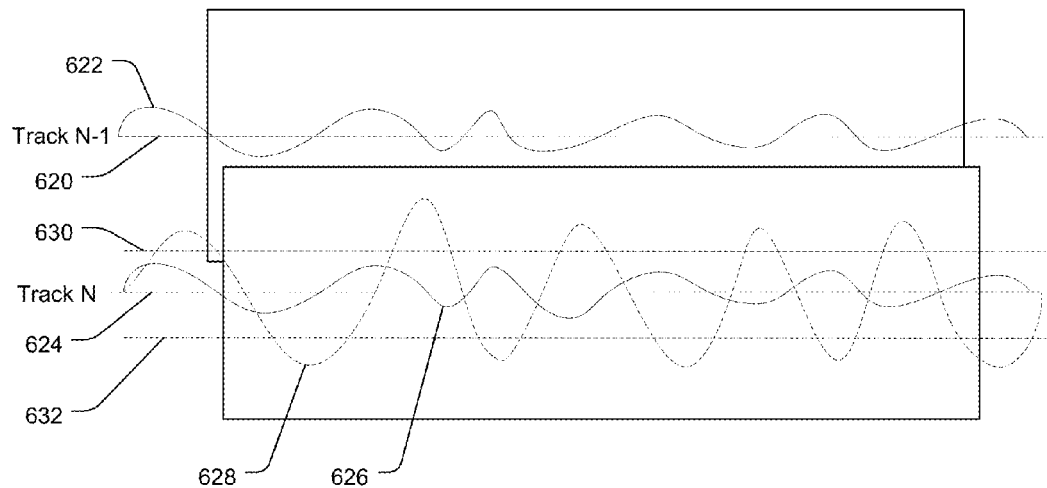

As previously stated, an acceptable WFT may vary between non-shingled recording and SMR. FIGS. 6A-6C depict examples write fault thresholds, in accordance with certain embodiments of the present disclosure. For simplicity, the example tracks are depicted having straight write center lines, and corresponding straight write fault threshold lines, without depicting RRO effects. In practice, write centers and write fault gates or thresholds may be somewhat "wavy" as depicted in FIGS. 3A and 3B.

Turning now to FIG. 6A, a diagram of write fault thresholds according to certain embodiments is shown. In some embodiments, the tracks of FIG. 6A may be an example of non-shingled recording tracks. Track N−1 may have a write center line 602, and data 604 written to track N−1 during normal operating conditions (e.g. no vibrations or other affects that may cause a transducer head to waver erratically). Adjacent to track N−1 may be track N, having a write center line 606. Track N depicts a write path 608 during normal operating conditions, and a write path 610 during conditions which may result in track misregistration (TMR). In order to prevent TMR from causing data recorded to tracks adjacent to track N to become difficult or impossible to read, WFTs may be used to control data recording operations to track N. Write fault thresholds 612 and 614 may prevent writing if the write head deviates from center line 606 by more than a set amount, e.g. 15% of the track pitch for track N. In the depicted example, the write transducer may exceed the write fault thresholds 612 and 614 only infrequently. Write fault thresholds 612 and 614 may provide adequate data integrity while maintaining satisfactory write throughput in non-shingled recording.

FIG. 6B depicts certain embodiments of write fault thresholds. The tracks of FIG. 6B may be configured for shingled recording, according to some embodiments. In the embodiment of FIG. 6B, the shingled recording direction may include recording track N−1, followed by track N. Subsequent tracks N+1, N+2, etc. (not shown) may be written to after track N. Track N−1 may have a write center 620, and data 622 recorded under normal write operating conditions. Track N may have a centerline 624, and data written to track N may partially overlap track N−1. A write path 626 for track N under normal operating conditions is shown. In addition, a write path 628 under conditions which may cause TMR is shown, such as if the data storage device is jostled.

Due to the partially overlapped nature of shingled recording and the corresponding increase in tracks per inch (TPI) on the disc, a lower amount of TMR can cause data loss or corruption. Accordingly, the write fault thresholds used in non-shingled recording (e.g. 15% of track pitch) may be too loose, and would allow adjacent track interference if used in SMR. In order to protect data integrity of shingled tracks, write fault thresholds 630 and 632 may be used when writing to track N, which thresholds may be lower than those used in non-shingled recording (e.g. 8% of track pitch). However, in some embodiments, tight write fault thresholds may result in the write fault thresholds 630 and 632 being exceeded frequently during device operation, which may negatively impact write throughput.

Accordingly, in some embodiments, such as with SMR, it may be beneficial to make the WFT greater on one side of a track than on the other side. FIG. 6C depicts certain embodiments of write fault thresholds. The tracks of FIG. 6C may be configured for shingled recording, according to some embodiments. As with FIG. 6B, certain embodiments of FIG. 6C may employ a write direction of writing to track N−1, then to track N, and potentially to tracks N+1, N+2, etc. (not shown). Track N−1 may have a write center line 640, and track N may have a write center line 644. Line 646 may indicate a recording path for track N by a write head during normal device operation, while line 648 may indicate the path of the write head during conditions that may cause TMR.

In order to protect data integrity, a write fault threshold for track N may be enforced that prevents data in previously written tracks (e.g. track N−1) from being overwritten. However, due to the shingled recording scheme, tracks following track N (e.g. tracks N+1, N+2, etc., not shown) have yet to be written. Therefore it may be less important to protect the following tracks from TMR, because those tracks may be recorded after track N. When the following tracks are written, any off-track writing from track N may be overwritten by the data written to the following tracks.

According to some embodiments, a first write fault threshold 650 toward previous tracks (e.g. the negative direction toward track N−1) may have a tight or low threshold value (e.g. 8% of track pitch), while a second write fault threshold 652 in the direction of following tracks (e.g. the positive direction toward track N+1, not shown) may have a looser or higher write fault threshold (e.g. 12%, or 15%, etc.). Loosening the WFT 652 in the positive direction may reduce write faults during noise conditions that may cause TMR, and therefore increase writing performance throughput.

It should be noted that while the example provided in FIG. 6C is of shingled recording tracks, the same technique may be applied to non-shingled recorded tracks. For example, when multiple non-shingled tracks are scheduled to be written in a set direction, a write fault threshold in the positive direction may be loosened. Similarly, if an adjacent track to a track N being written contains invalid data (e.g. no data is recorded to the track, or the track contains old data that is no longer current), the WFT on the side of the adjacent track without valid data may be loosened. Other techniques are also possible.

The controller (such as controller 206) or servo control system (such as servo control 220 of FIG. 2) of a data storage device may retrieve write threshold values from a memory of the device, such as a ROM. The values may be determined and stored during manufacture of a data storage device (DSD), for example by a manufacturer during a certification process. In some embodiments, the determination of the WFT may be performed by the DSD itself during field operation if circumferential properties vary over time.

In some embodiments, WFT values may be saved per head and surface of a storage medium (e.g. in a data storage device include a disc stack with multiple heads and multiple discs), per zone, per shingled band, according to other storage area delineations, or any combination thereof. For example, in some embodiments each shingled band in a zone may have the same write direction, and therefore a positive direction write threshold value and a negative direction write threshold value may be stored and applied.

In some embodiments, only a "base" WFT value may be stored, and this threshold can be adjusted by the servo controller. For example, shingled zones may have a base WFT of 8% of track pitch. The servo system may apply the base WFT value in the negative direction, and apply a WFT value of "base+X" in the positive direction. For example, the variable may be a set percentage of track pitch. In an example, the base WFT value may be 8% of track pitch, with an additional selected amount or set variable of 4% of track pitch; e.g. for a total WFT value of 12% of track pitch in the positive direction. In some embodiments, the variation may be a multiplier of the base value. For example, a base WFT value of 10% of track pitch may be multiplied by 1.5×, to apply a WFT of 15% of track pitch in the positive direction.

In some embodiments, two or more different modifiers to the base value may be employed. For example, the different modifiers may be selected based on a state of the drive. In some embodiments, the drive may employ a "base+X" WFT in the positive direction when the drive is in a non-vibration state, while a "base+Y" WFT, with a looser or higher fault tolerance, may be applied when a vibration state is detected, for example using a speaker vibration test. For example, applying the modifier "X" may result in a lower WFT or fault tolerance for situations when the drive is not in a vibration condition, while modifier "Y" may allow a higher WFT to maintain a desired write performance throughput even when vibrations are occurring. Other embodiments are also possible.

Similarly, a controller or servo system of the data storage device may check a pending queue of write operations, to determine whether multiple adjacent tracks will be written in a set direction. For example, this approach may be useful when performing non-shingled recording. If multiple adjacent tracks will be written in a set direction, the servo control may apply the modifier for a base WFT value in the set direction. If multiple adjacent tracks will not be written in a set direction, only the base WFT value will be applied. In some embodiments, a controller or servo system may determine whether invalid data is contained in portions of a track adjacent to the portions of a track to be written. The servo system may apply a loosened or lower WFT value when an adjacent track portions include invalid data, and apply the base WFT value when adjacent track portions do not include invalid data. Other embodiments are also possible.

Figure 7:
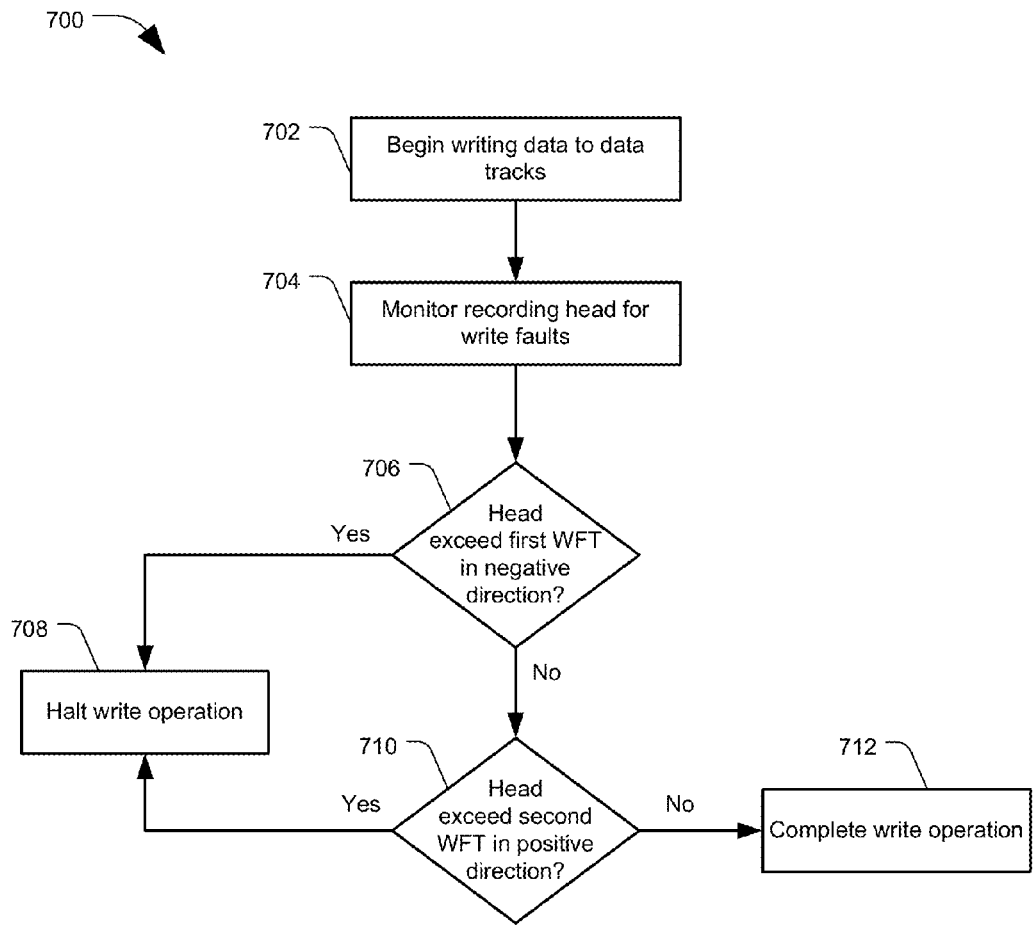
FIG. 7 is a flowchart of a method for applying asymmetrical write faults, in accordance with certain embodiments of the present disclosure.

FIG. 7 is a flowchart of an example method for applying asymmetric write fault thresholds, generally designated 700. The method 700 may include beginning a write operation to one or more data tracks of a data storage device, at 702. The data storage device, by using the servo control system for example, may monitor the position of the recording head relative to a track center to detect write faults, at 704. In some embodiments, the one or more target data tracks may be shingled recording tracks, where one track partially overlaps an adjacent track.

The method 700 may involve determining whether the write head exceeds a first write fault threshold (WFT) value in a negative direction, at 706. Exceeding a WFT may involve moving beyond a threshold distance from a write center of a recording track. In some embodiments, the negative direction in a shingled recording system may be a direction towards previously recorded tracks that may be partially overlapped by writing to the current track. If tracks are written in the order of N−1, N, and N+1, while writing to track N the negative direction may be in the direction of track N−1. Conversely, the positive direction may be towards track N+1, which may be a track that has yet to be written with current valid data. Similarly, for non-shingled magnetic recording, the positive direction may be toward adjacent tracks that are scheduled to be written, or that do not contain valid data. The negative direction in non-shingled recording may be towards adjacent tracks that have been written with valid data.

If the recording head does exceed the first WFT in the negative direction, at 706, the method 700 may include halting the write operation, at 708. This may involve preventing the write head from recording data to the data storage medium until the head has stabilized over the desired track. In some embodiments, the data storage system may pause write operations until a disc storage medium has performed a full revolution and the write operation may resume where it was halted.

If the recording head does not exceed the first WFT in the negative direction, at 706, the data storage device may detect whether the write head has exceeded a second WFT in the positive direction, at 710. The second WFT may be lower or looser than the first WFT, allowing the write head to deviate from the track center more in the positive direction than in the negative direction. For example, the first WFT may be 10% of track pitch, while the second WFT may be 20% of track pitch. Other WFT values may also be used.

If the write head has exceeded the second WFT in the positive direction, at 710, the method 700 may include halting the write operation, at 708. If the head does not exceed the second WFT value in the positive direction, the method may include completing the write operation, at 712.

Figure 8:
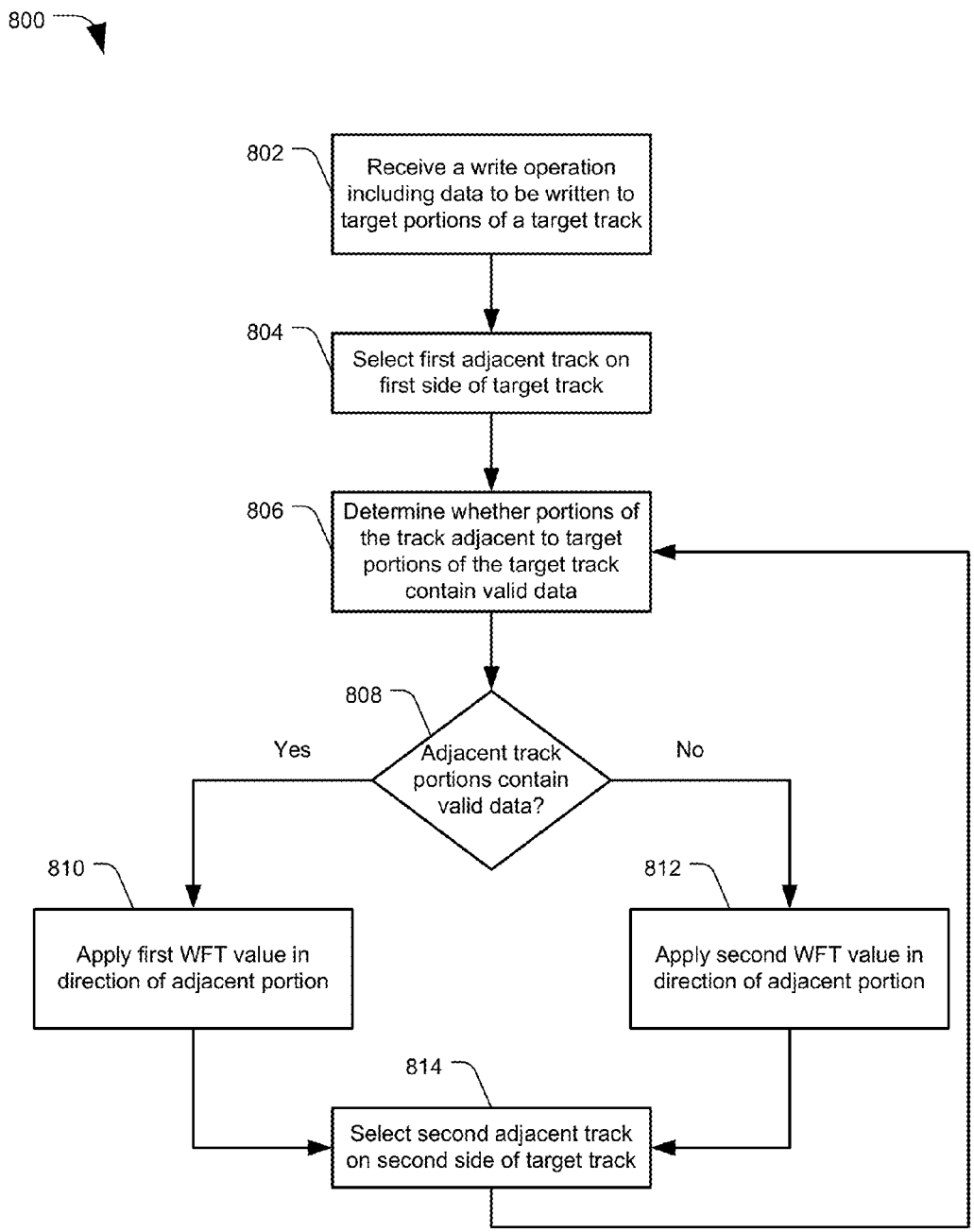
FIG. 8 is a flowchart of a method for applying asymmetrical write faults, in accordance with certain embodiments of the present disclosure.

FIG. 8 depicts a method for applying asymmetrical write fault thresholds, generally designated 800, according to certain embodiments of the present disclosure. Method 800 may include receiving a write operation, such as from a host device, the write operation including data to be written to target or selected portions of a target track, at 802. For example, if a track includes 1,000 data sectors for user data, the target portion may include the first 200 data sectors.

Method 800 may include selecting a first adjacent track on a first side of the target track, at 804. For example, this may include a track in a negative recording direction for shingled recording systems. For non-shingled recording, this may include an adjacent track in the direction of the inner diameter (ID) or the outer diameter (OD) of the recording medium.

The method 800 may include determining whether portions of the track adjacent to the target portions of the target track include valid data, at 806 and 808. For example, assume each track has 1,000 data sectors that are circumferentially aligned with each adjacent track, and the target portion is the first 200 data sectors of the target track. In this example, the portions adjacent to the target portions may be the first 200 data sectors of the track preceding the target track. However, it should be understood that different tracks on a storage medium may have a different number of data sectors from each other. For example, the first 210 sectors on one track may be adjacent to the first 200 sectors on the next track. In other embodiments, sectors on adjacent tracks may not be circumferentially aligned. One skilled in the art can apply the described method to different track configurations without undue experimentation.

Data may be considered "valid" data if it is a most current version of data, and has not been marked as deleted or marked for deletion. It may include data that a host has saved for later retrieval. Conversely, data may be "invalid" if it is not the most current version of the data. In some embodiments of shingled recording, when a shingled band is to be written to, writing may be achieved with a read-modify-write (RMW) operation. A RMW operation may involve reading data from the band, modifying the data with any new data for writing, and writing the modified data back to the band. In this case, data in the shingled band that has already been read and will be rewritten may be considered "invalid" data. However, method 800 may be applied to other methods of shingled recording, as well as to non-shingled tracks.

If the adjacent track portions do contain valid data, at 808, the method 800 may include applying a first write fault threshold (WFT) value in the direction of the adjacent track, at 810. For example, the first WFT value may be a "base" WFT, or simply a first selected value. If the write head exceeds the first WFT in the direction of the first adjacent track, write operations may be suspended.

If the adjacent track portions do not contain valid data, at 808, the method 800 may include applying a second WFT value in the direction of the adjacent portion, at 812. The second WFT may be looser or lower than the first WFT value. In some embodiments, the second WFT value may be derived by applying a modifier to the first WFT. In some embodiments, the second WFT value may be a second selected value unrelated to the first WFT. In an example where the second WFT is lower than the first WFT, the recording head may be allowed to deviate from the target track center line toward the first adjacent track more than if the first WFT value were applied.

The method 800 may next involve selecting a second adjacent track on the second side of the target track, at 814. For example, if the first adjacent track was in a negative writing direction, the second adjacent track may be in the positive writing direction from the target track. If the first adjacent track was in the direction of the ID, the second adjacent track may be in the direction of the OD from the target track.

The method 800 may then repeat from 806 to determine whether portions of the second track adjacent to the target portions of the target track contain valid data. In this manner, different WFT values may be applied on each side of the target track during a write operation.

Figure 9:
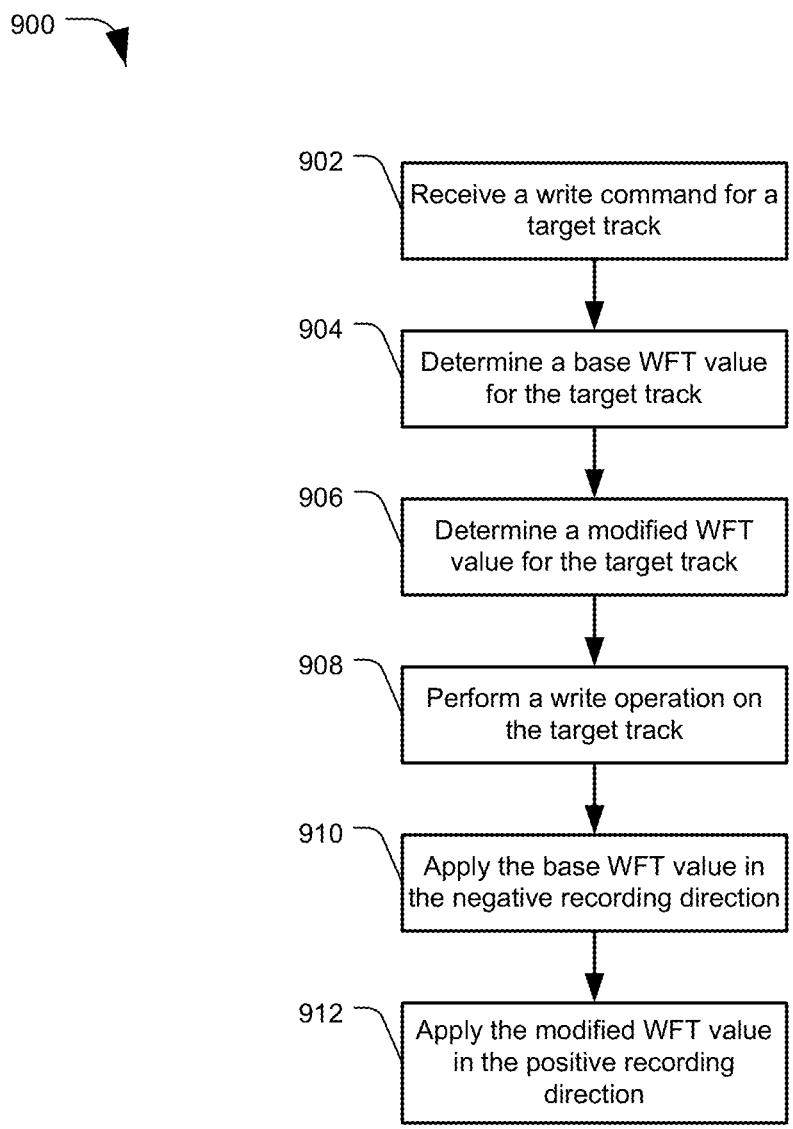
FIG. 9 is a flowchart of a method for applying asymmetrical write faults, in accordance with certain embodiments of the present disclosure.

FIG. 9 depicts a method for applying asymmetrical write fault thresholds, generally designated 900 FIGS. 6A, 6B, and 6C are diagrams of examples of a system including write faults, in accordance with certain embodiments of the present disclosure. The method 900 may include receiving a write command for a target track, at 902. For example, a data storage device (DSD) may receive a write command including data, and the DSD may determine one or more target tracks of a data storage medium to which to write the data. The method may include determining a base write fault threshold (WFT) value for the target track. A WFT value may be a distance or percentage of track pitch that a write head may from the target track's write center before the DSD suspends write operations. A DSD may determine a base WFT value by consulting a table stored to a memory. The memory may include WFT values based on specified storage areas of the data storage device, such as by track, by zone, by disc surface, by write head, by other factors, or any combination thereof.

The method 900 may include determining a modified WFT value for the target track, at 906. In some embodiments, a modified WFT value may be an adjustment of the base WFT value for the track. For example, if the base WFT is 10% of track pitch, the modified WFT value may be calculated as (base WFT*1.5), producing a result of 15% of track pitch. In another example, the modified WFT value may be calculated as (base WFT+Adjustment Value). If the base WFT is 8% of track pitch, and the Adjustment Value is 5% of track pitch, the modified WFT value may be 13% of track pitch. Other embodiments are also possible.

The method 900 may include performing a write operation corresponding to the write command to the target track, at 908. This may involve having a write head seek to the target track and begin storing data to selected sectors of the target track. During the write operation, a servo system may monitor the position of the write head relative to a write center of the target track. The write center may be defined by servo data written to the target track at intervals along the track. If the write head exceeds a WFT value for the target track, the servo system may suspend the write operation to prevent off-track writing.

The method 900 may include applying the base WFT value in a negative recording direction, at 910. For example, the write operation involves storing data to shingled recording tracks, the shingled band of tracks may have a set order or direction in which the tracks are to be written (e.g. track N−1, track N, track N+1, etc.). The direction opposite to the set direction may be the negative direction. In some embodiments, the "negative" recording direction may refer to any side of the target track where the adjacent track contains valid data. If the target track is track N, and the negative recording direction is towards track N−1, the method 900 may include suspending write operations if the write head exceeds the base WFT value from the centerline of track N towards track N−1.

The method 900 may include applying the modified WFT value in the positive recording direction, at 912. For example, the positive direction for shingled recording may be in the direction of the next track to be written in the shingled write scheme (e.g. when writing to track N, the positive recording direction may be towards track N+1). In some embodiments, the "positive" recording direction may refer to any side of the target track where the adjacent track contains invalid data. For example, there may be limited risk of losing valid data if off-track writing occurs towards a track storing invalid data. If the target track is track N, and the positive recording direction is towards track N+1, the method 900 may include suspending write operations if the write head exceeds the modified WFT value from the centerline of track N towards track N+1.

It should be understood that variations in the method are within the scope of the present disclosure. For example, in some embodiments the base WFT value may be applied in the positive recording direction, and a modified WFT value may be applied in the negative recording direction. In some embodiments, both adjacent tracks to the target track may include valid data, and the base WFT value may be applied in both directions for the target track. In some embodiments, both adjacent tracks may include invalid data, and the modified WFT value may be applied in both directions. Other embodiments are also possible.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to:
   determine a first write fault value and a second write fault value for a set of tracks of a data storage device, the first write fault value and the second write fault value each representing an amount of off-track deviation of a data writing system within which data writing operations are performed, the first write fault value having a lower fault tolerance for the data writing system to deviate from a track center than the second write fault value;
   write data to a selected track in the set of tracks, including:
   applying the first write fault value relative to the selected track in a first direction of a first adjacent track immediately preceding the selected track; and
   applying the second write fault value relative to the selected track in a second direction of a second adjacent track immediately following the selected track.

2. The apparatus of claim 1 further comprising:
   the set of tracks includes a set of shingled tracks where one track partially overlaps an adjacent track, so that data written to the one track is partially overlapped with data written to the adjacent track, wherein data is written to the set of tracks in a first writing direction.

3. The apparatus of claim 2 comprising the circuit further configured to:
   apply the first write fault value in a direction opposite to the first writing direction; and
   apply the second write fault value in the first writing direction.

4. The apparatus of claim 1 further comprising:
   the first adjacent track contains valid data that is a most current version of data not marked for deletion; and
   the second adjacent track contains invalid data that is not a most current version of data.

5. The apparatus of claim 1 comprising the circuit further configured to:
   retrieve the first write fault value from a memory of the data storage device.

6. The apparatus of claim 5 comprising the circuit further configured to:
   calculate the second write fault value based on the first write fault value.

7. The apparatus of claim 5 further comprising:
   the memory; and
   the memory stores write fault values based on specified storage areas of the data storage device.

8. A method comprising:
   determining a first write fault value and a second write fault value for a target track of a disc memory, the first write fault value and the second write fault value each representing an amount of off-track deviation of a data writing system within which data writing operations are performed, the first write fault value having a lower fault tolerance from a track center of the target track than the second write fault value;
   writing data to the target track, including:
   applying the first write fault value in a first direction of a first track immediately preceding the target track; and
   applying the second write fault value in a second direction of a second track immediately following the target track.

9. The method of claim 8 further comprising:
   writing the data to a set of shingled tracks including the target track in a shingled manner where one track partially overlaps an adjacent track, so that data is written to each track in the set of shingled tracks in a sequential order having a first writing direction.

10. The method of claim 9 further comprising:
    applying the first write fault value in a direction opposite to the first writing direction; and
    applying the second write fault value in the first writing direction.

11. The method of claim 8 further comprising:
    writing the data to selected portions of the target track;
    a portion of the first track contains valid data that is a most current version of data not marked for deletion; and
    a portion of the second track contains invalid data that is not a most current version of data.

12. The method of claim 8 further comprising:
    retrieving the first write fault value from a memory device;
    calculating the second write fault value based on the first write fault value.

13. The method of claim 12 further comprising:
    calculating the second write fault value includes applying a multiplier to the first write fault value.

14. The method of claim 12 further comprising
    calculating the second write fault value includes adding a selected amount to the first write fault value.

15. The method of claim 8 further comprising:
determining whether an apparatus including the disc memory is in a vibration condition;
applying the second write fault value in the second direction of the second track when the apparatus is not in the vibration condition; and
applying a third write fault value in the second direction of the second track when the apparatus is in the vibration condition, the third write fault value having a higher fault tolerance than the second write fault value.

16. An apparatus comprising:
a memory device storing instructions that, when executed, cause a processor to perform a method including:
receiving a write command including data to be written to a target track;
writing the data to the target track, including:
applying a first write fault value in a first direction from the target track; and
applying a second write fault value in a second direction from the target track, the first direction different from the second direction, and
the first write fault value and the second write fault value each representing an amount of off-track deviation of a recording head from a track center within which data writing operations are performed, the first write fault value having a lower fault tolerance from the track center than the second write fault value.

17. The apparatus of claim 16, further comprising:
the memory device storing instructions that, when executed, cause a processor to perform the method further including:
writing the data to the target track in a set of shingled tracks where one track partially overlaps an adjacent track, so that the set of tracks is written in a shingled writing direction such that each track in the set of tracks is written in a sequential order.

18. The apparatus of claim 17, further comprising:
the memory device storing instructions that, when executed, cause a processor to perform the method further including:
applying the first write fault value in the first direction opposite to the shingled writing direction; and
applying the second write fault value in the second direction corresponding to the shingled writing direction.

19. The apparatus of claim 16, further comprising:
the memory device storing instructions that, when executed, cause a processor to perform the method further including:
determining to apply the first write fault value when a first adjacent track in the first direction from the target track contains valid data that is a most current version of data not marked for deletion; and
determining to apply the second write fault value when a second adjacent track in the second direction from the target track contains invalid data that is not a most current version of data.

20. The apparatus of claim 16, further comprising:
the memory device storing instructions that, when executed, cause a processor to perform the method further including:
retrieving the first write fault value from a memory of a data storage device; and
calculating the second write fault value based on the first write fault value.

* * * * *